United States Patent [19]
Clyde et al.

[11] Patent Number: 4,991,974
[45] Date of Patent: Feb. 12, 1991

[54] METHOD OF AND IMPLEMENT FOR MIXING FARINACEOUS MATERIAL

[75] Inventors: Neil Clyde, Burnley; Mark D. Yell, Sheffield, both of England

[73] Assignee: Tweedy of Burnley Limited, Lancashire, England

[21] Appl. No.: 307,011

[22] Filed: Feb. 6, 1989

[30] Foreign Application Priority Data

Feb. 6, 1988 [GB] United Kingdom ............... 8802709

[51] Int. Cl.$^5$ .............................................. B01F 7/04
[52] U.S. Cl. ................................... 366/279; 366/309
[58] Field of Search ............ 366/279, 309, 310, 311, 366/312, 313, 96, 97, 98, 99, 69; 99/348

[56] References Cited

U.S. PATENT DOCUMENTS

| | | | |
|---|---|---|---|
| 1,062,201 | 5/1913 | Stiriz | 366/97 |
| 1,518,418 | 12/1924 | Streich | 366/97 |
| 2,576,575 | 11/1951 | Collins | |
| 2,936,487 | 5/1960 | Paz | |
| 3,739,710 | 6/1973 | Costa | 99/348 |
| 4,311,397 | 1/1982 | Wright | 366/98 |

FOREIGN PATENT DOCUMENTS

| | | |
|---|---|---|
| 0009666 | 9/1979 | European Pat. Off. |
| 0140024A3 | 8/1984 | European Pat. Off. |
| 117394 | 2/1901 | Fed. Rep. of Germany |
| 448197 | 7/1927 | Fed. Rep. of Germany |
| 1507894 | 4/1969 | Fed. Rep. of Germany |
| 3117023 | 3/1982 | Fed. Rep. of Germany |
| 3317572 | 11/1983 | Fed. Rep. of Germany |
| 392257 | 9/1907 | France |
| 61-143401 | 1/1986 | Japan |

Primary Examiner—Robert W. Jenkins

[57] ABSTRACT

Five fins located on a second arm engage the farinaceous material during mixing and the angled surface of each fin directs the farinaceous material in an axial direction towards the housing of the rotor, and also in a direction extending between the surface of the arm and the adjacent parallel surface of the container. The fins also cause the farinaceous material to be moved in the same two directions, with the exception that the dough is directed away from the housing of the rotor towards the central region.

11 Claims, 4 Drawing Sheets

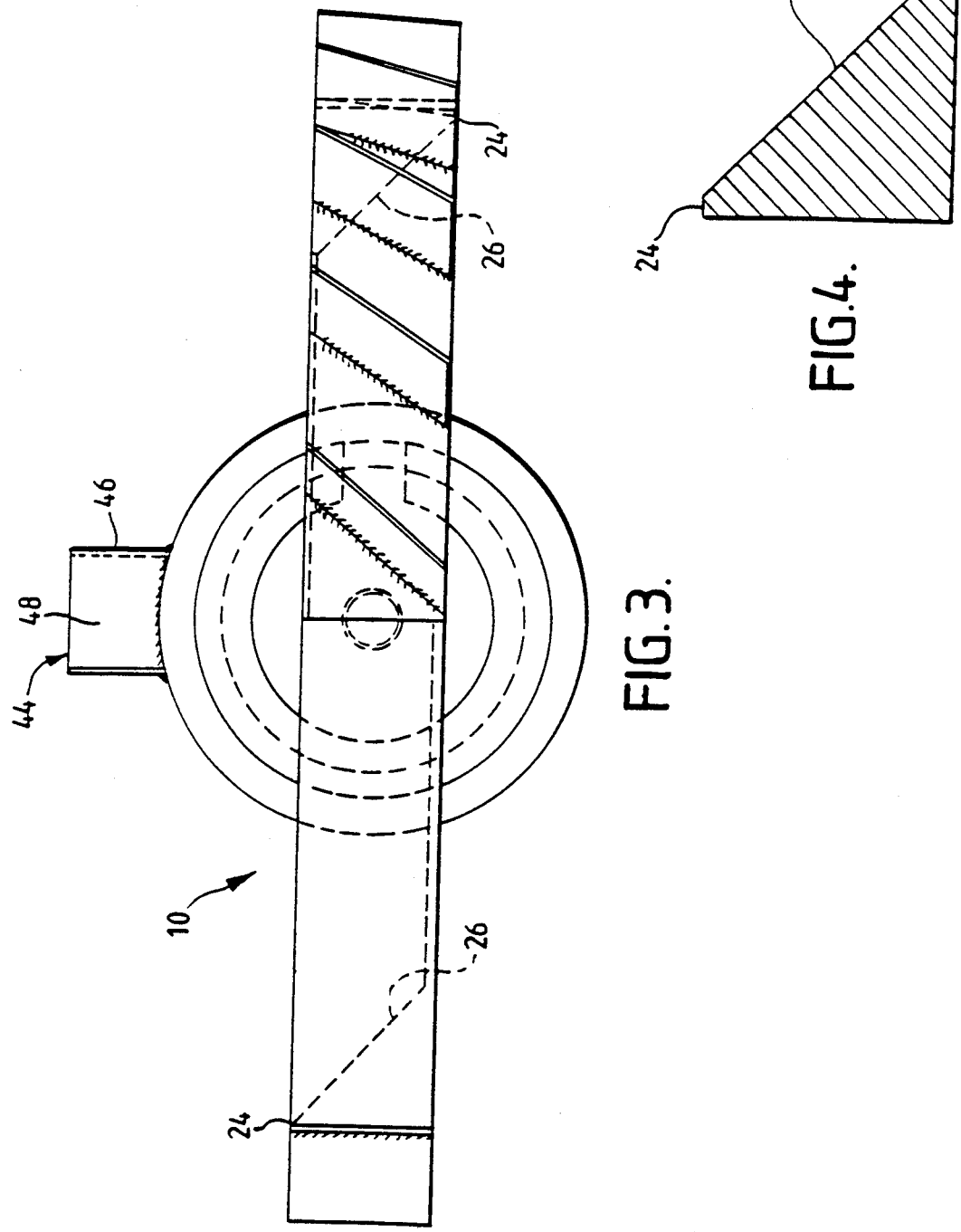

METHOD OF AND IMPLEMENT FOR MIXING FARINACEOUS MATERIAL

The present invention relates to a method of and implement for mixing farinaceous material.

BACKGROUND OF THE INVENTION

In a known method of mixing farinaceous material a rotor is rotated at high speed in the material. The rotor may comprise two extents of bar which are connected together at either end along the rotational axis but diverge away from each other in an arc between those connections. The bars are circular in cross-section. Accordingly when the rotor rotates the material around the rotor is moved slightly in the direction of rotation but little mixing is achieved. Thus the material takes a considerable time to develop and different parts of the mixture may have different temperatures as, particularly with the mixture on the outside of the rotor, the mixing is not complete or rapid enough.

BRIEF SUMMARY OF THE INVENTION

According to one aspect of the present invention a method of mixing farinaceous material in a container comprises rotating a mixing implement about an axis to cause farinaceous material located between the mixing implement and a portion of the wall of a container located on a radius passing through the implement to move in a first direction which is transverse to the direction of movement of the implement at that location and transverse to the extent between the rotor and the radially outward wall. With such a method of mixing the farinaceous material located between the mixing implement and the radially outward portion of the container is caused to move and mix without necessarily being exerted to excessive pressure such as may damage the material, and consequently a better mix with an even temperature dispersion is obtained rapidly. The method may comprise causing farinaceous material located between the mixing implement and the adjacent or radially outward portion of the wall to move in the first direction and a second radially inwards direction with respect to the rotational axis of the implement.

The method may comprise causing substantially all of the farinaceous material, at at least one radial orientation, located between the mixing element and the radially outward portion of the wall of the container to move in a first direction and possibly in the second direction as well.

The method may comprise causing two axially spaced portions of the implement to cause different portions of the farinaceous material located between the implement and the wall of the container to move in said first direction, and possibly also in the second direction, and the material so moved by the different axially spaced portions may move in first directions which extend towards each other.

Any movement of the farinaceous material located between the implement and the wall of the container may be assisted or caused by a baffle located between the implement and the wall of the container, and the baffle may rotate, and the direction of rotation of the baffle may be in an opposite direction to the direction of rotation of the implement.

The implement may be arranged to move farinaceous material in the first direction, and possibly also in the second direction continually during rotation of the implement.

At least a portion of the farinaceous material radially located between the axis of the implement and the associated portion of the rotor causing the movement of that farinaceous material through which the mixing implement moves may move inwardly and/or axially with respect to the rotational axis.

According to another aspect of the present invention a mixing implement, in use, is arranged to be rotatably mounted in a container of farinaceous material, the implement being shaped such that when the implement is so rotatably mounted, upon rotation thereof in farinaceous material a portion of the farinaceous material located between the implement and a radius passing through the implement to the wall of the container is caused to move in a first direction which is transverse to the direction of movement of the implement at that location and transverse to the extent between the implement and the adjacent wall. The implement may also be shaped such that, when the implement is rotatably mounted in a container of farinaceous material, and the implement is rotated, farinaceous material located between the implement and the radially outer wall is caused to move in a second radial inwards direction with respect to the rotational axis of the implement.

According to a further aspect of the present invention, a rotatably mountable mixing implement includes at least one surface having a radial and an axial extent and an extent transverse to the radial and axial extent. The surface may be connected to a portion of the implement located radially inwards of the majority of the surface. The surface may be provided on one side of a plate. A plurality of such surfaces may be provided, and each surface may be arranged, in use, to pass adjacent to the wall of a container within which the implement may be mounted.

Where a plurality of such surfaces are provided, the direction in which the surfaces extend transverse to the radial and axial extent may be common, or some surfaces may extend in an opposed direction to others. The direction in which the surfaces extend transverse to the radial and axial extent many be arranged to be in one direction along one axial extend and in the opposite direction along another axial extent. The surfaces which extend in opposed directions transverse to the radial and axial extents may be connected to portions of the implement which are circumferentially spaced from each other.

The portion or portions of the implement to which the surface or surfaces are connected may include a further inwardly extending trailing surface (with respect to the intended direction of travel).

The present invention also includes a mixing implement when used in a method of mixing farinaceous material.

BRIEF DESCRIPTION OF THE DRAWINGS

The invention may be carried into practice in various ways, but one embodiment will now be described by way of example and with reference to the accompanying drawings, in which:

FIG. 3 is a plan view of the rotor of FIG. 1,

FIG. 4 is a cross-section through a mixing arm on the rotor taken along the line IV—IV of FIG. 1.

DETAILED DESCRIPTION OF THE DRAWINGS

Figure 1:
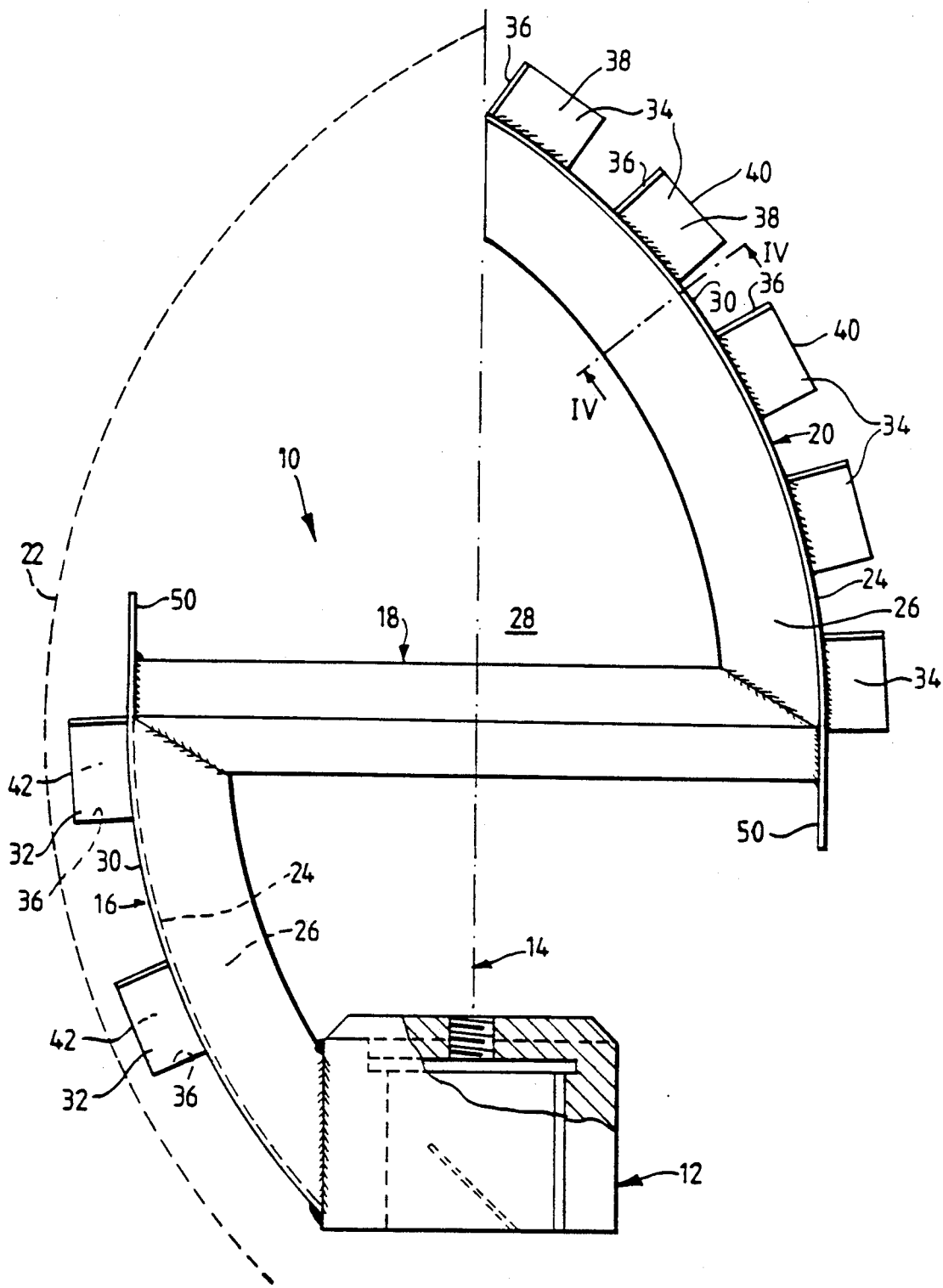
FIG. 1 is a front view of the rotor.
Figure 2:
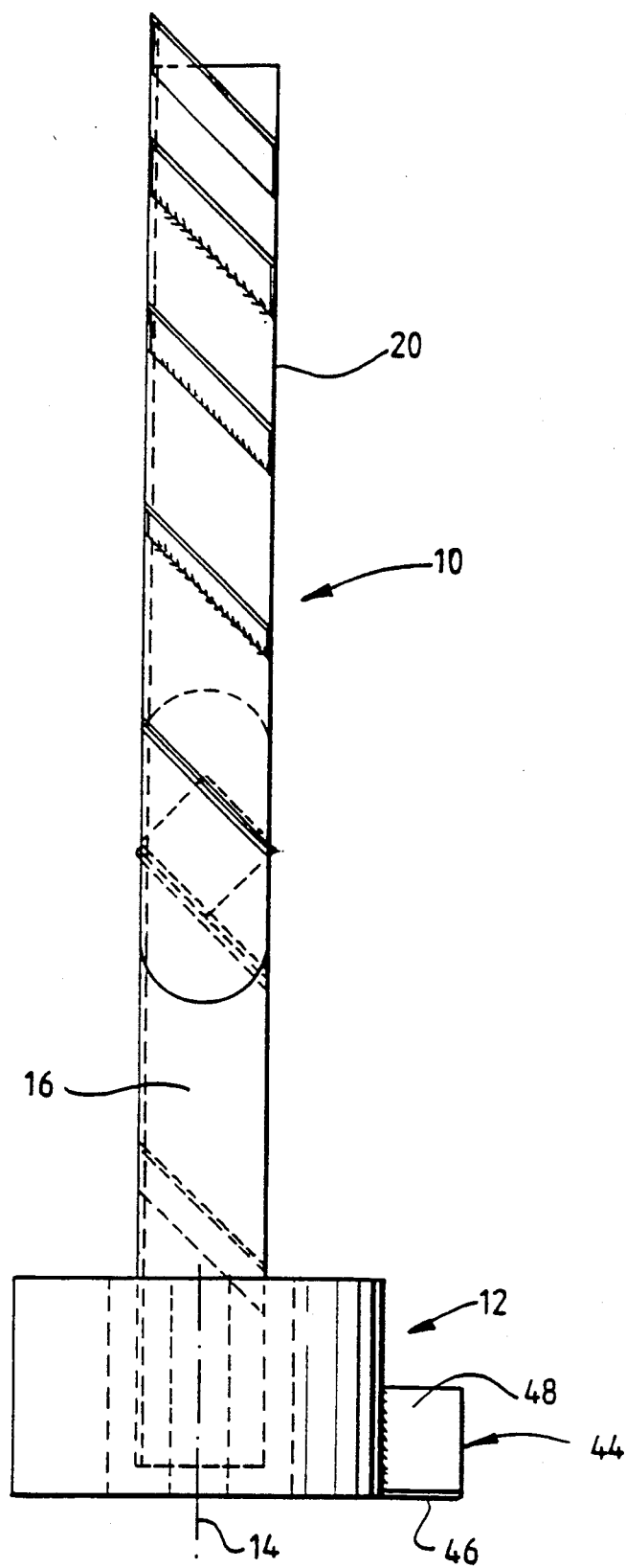
FIG. 2 is a side view of FIG. 1.

As shown in the FIGURES, the rotor 10 includes a housing 12 which, in use, is mounted on the end of a drive shaft and which rotates the rotor in an anticlockwise direction about an axis 14.

A first mixing arm 16 extends from one side of the housing 12 upwardly and outwardly, with respect to the rotational axis for just under half the overall length of the rotor. At the far end of the arm 16, a cross member 18 extends across the rotational axis 14 perpendicular thereto. At the end of the cross member 18 remote from the arm 16, a second mixing arm 20 extends away from the housing and inwardly to the rotational axis 14 where it terminates.

A chain line 22 shown in FIG. 1 indicates the proximity of a baffle blade which scrapes the inside of a spherical mixing vessel by rotating in a clockwise direction. The baffle blade is located between the rotor and the spherical vessel wall.

In use, the leading edge 24 of both the first and second mixing arms 16 and 20 breaks and splits the dough. A trailing surface 26 extends rearwardly (with respect to the direction of rotation) and inwardly towards a central region 28 located between the housing 12 or the rotor and the free end of the second arm 20 and within the area swept by the arms. That trailing surface 26 drags the main mass of farinaceous material towards the central region 28.

On the outer surface 30 of the first and second arms 16 and 20, which surface 30 extends generally tangentially to the radius of the rotational axis, are a set of spaced fins 32 and 34 respectively.

Five such fins are located on the second arm 20, and the leading edge 36 of each of those fins engages the farinaceous material during mixing and the forwardly facing surface 38 (which trails behind the leading edge 36) of each fin directs the farinaceous material in an axial direction towards the housing of the rotor and also towards the main mass of material in the central region 28 extending all the way across the rotor. When the second arm passes adjacent to the baffle blade in the region of the chain line 22, the outer edge 40 of each fin shears the farinaceous material against the baffle. Thus the fins 34 drag the outer portion of the farinaceous material axially back in to the main mass to ensure an even mixing rate and a uniform mixing temperature or uniform dispersion of temperature throughout the material without undue pressure being exerted on the dough between the outer portion of the rotor and the baffle or container wall, which undue pressure is damaging for the mix. The movement exerted on the farinaceous material by the fins 34 occurs during the complete rotational cycle of the rotor but that movement is greatest when the blades co-operate with the baffle.

The two fins 32 on the first mixing arm 16 act in the same way on the farinaceous material as the fins 34 with the exception that the forwardly facing surface 42 of those fins which engages the dough trails from the leading edge 36 and is angled away from the housing 12 such that material with which those fins co-operate is directed axially away from the housing 12 towards the central region 28.

As the first and second arms, and in particular the surfaces 30, do not extend parallel to the rotational axis, material engaged by the forwardly facing surfaces 38 and 42 of the fins is also caused to move radially outwards as well as axially towards a central axial region.

The cross-member 18 is square in section and is angled such that opposite edges of the cross-member engage and break or split up the farinaceous material which may comprise dough or opposite sides of the rotational axis.

A blade 44 is mounted on the housing with its leading edge 46 extending radially with respect to the rotational axis at the end of the housing. The leading edge of the blade is able to scrape the inner surface of the container by passing adjacent to that surface, and the surface 48 of the blade which co-operates with the mixture in use directs such mixture towards the central region 28.

Each mixing arm 16 and 20 extends from a different end of the cross-member, and in region of each end a blade 50 extends in the opposite direction to that in which the arm extends. The blades 50 are generally in the same plane as the outer surface 30 of the arms in the region of the cross-member and those blades to cut through the farinaceous material and assist in the free rotational movement of the rotor through the material.

The rotor rapidly develops the farinaceous mix without significantly damaging the mix by exerting undue shear thereon.

Figure 5:
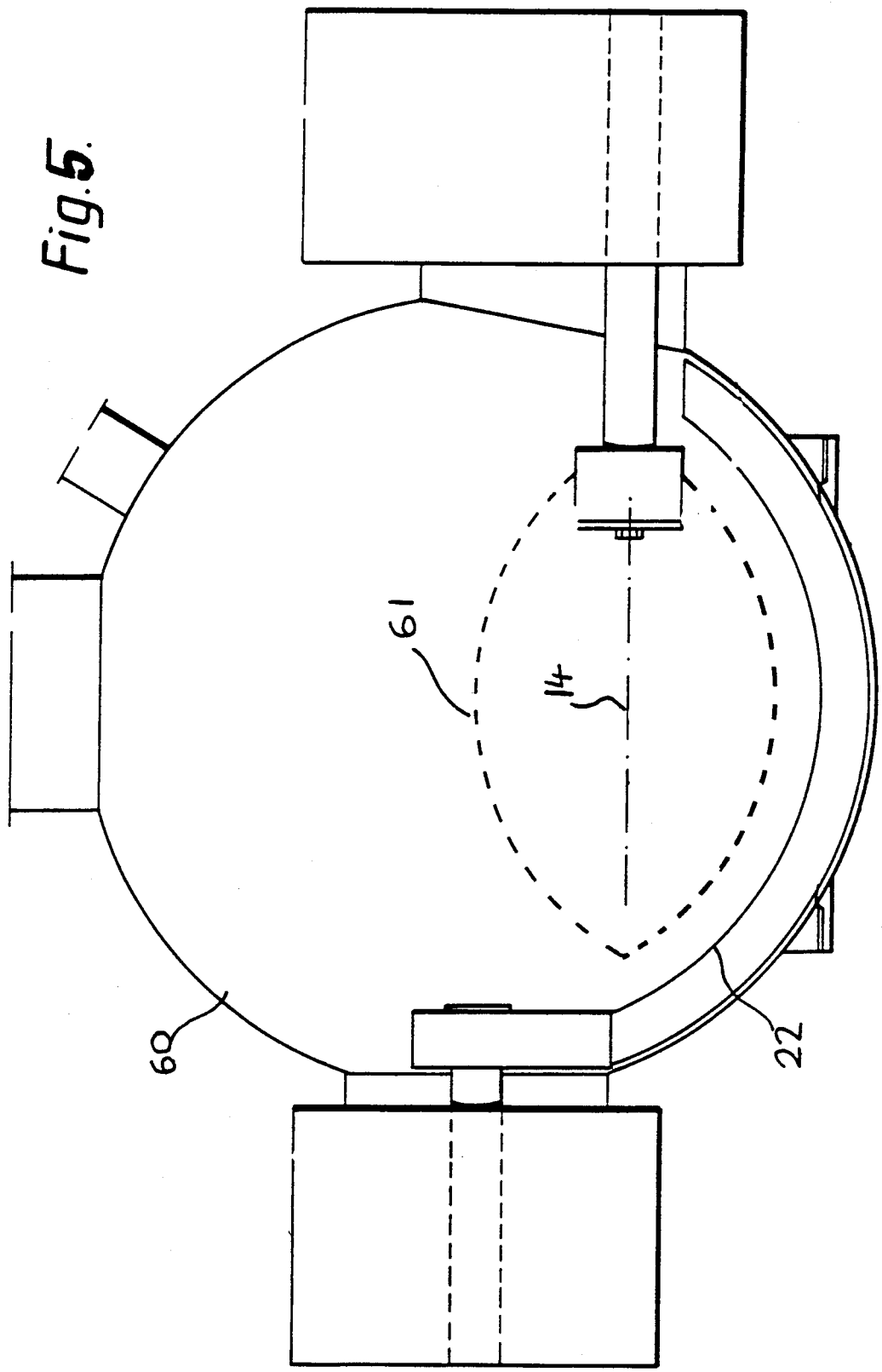
FIG. 5 is a view of a container with a mixing implement mounted therein.

The mixing implement 10 is mounted in the lower region of a container 60. The area swept out by the mixing implement as it rotates is shown by the broken line 61 of FIG. 5.

What is claimed is:

1. A method of mixing farinaceous material using a mixing implement in a container having a wall comprising
    rotating said mixing implement about an axis to cause farinaceous material located between said mixing implement and a portion of said wall of said container located on a radius passing through said implement to move in a first direction and a second direction,
    said first direction being transverse to the direction of movement of said implement at that location and transverse to the extent between said implement and said portion of said wall, said material moving in said first direction from one axial end of said implement towards and axial region located intermediate the ends of said implement, and
    said second direction being transverse to the direction of movement of said implement at that location and transverse to the extent between said implement and said portion of said wall, said material moving in said second direction from the other axial end of said implement towards said axial region located intermediate the ends of said implement.

2. A method of mixing farinaceous material using a mixing implement in a container having a wall comprising:
    rotating said mixing implement about an axis to cause farinaceous material at two axially spaced first and second locations located between said mixing implement and a portion of said wall of said container located on a radius passing through said implement to move in a first direction at said first location and a second direction at said second location;
    the movement at said first location in said first direction being transverse to the direction of movement of said implement at that location and transverse to the extent between said implement and said portion of said wall, said material moving in said first direction in the general direction extending from one axial end of said implement towards an axial region located intermediate the ends of said implement;

said wall extending from said first location in an outwards direction with respect to the rotational axis of said implement in the general direction from said one end of said implement towards said other end of said implement;

the movement at said second location in said second direction being transverse to the direction of movement of said implement at that location and transverse to the extent between said implement and said portion of said wall, said material moving in said second direction in the general direction extending from the other axial end of said implement towards said axial region located intermediate the ends of said implement;

said wall extending from said second location in an outwards direction with respect to the rotational axis of said implement in the general direction from said other axial end of said implement towards said one end of said implement.

3. A method according to claim 2 wherein a plurality of axially spaced first locations are provided at which material moves in said first direction.

4. A method according to claim 3 wherein a baffle is located between said implement and said wall, said baffle assisting in the movement of said material at said first and second locations in said first and second direction, respectively.

5. A method according to claim 4 and further comprising rotating said baffle.

6. A method according to claim 5 and further comprising rotating said baffle in an opposed direction to the direction of rotation of said implement.

7. A method according to claim 2 wherein a plurality of axially spaced second locations are provided at which material moves in said second direction.

8. A method according to claim 2 in which said implement moves farinaceous material at a first location in said first direction continually during rotation of said implement.

9. A method according to claim 2 in which said implement moves farinaceous material at a second location in said second direction continually during rotation of said implement.

10. A method according to claim 2 in which at least a portion of the farinaceous material radially located between said rotational axis of said implement and a portion of said implement moves inwardly with respect to the rotational axis.

11. A method according to claim 2 in which at least a portion of the farinaceous material located between the rotational axis of said implement and a portion of said implement moves axially with respect to the rotational axis.

* * * * *